Figure 1:
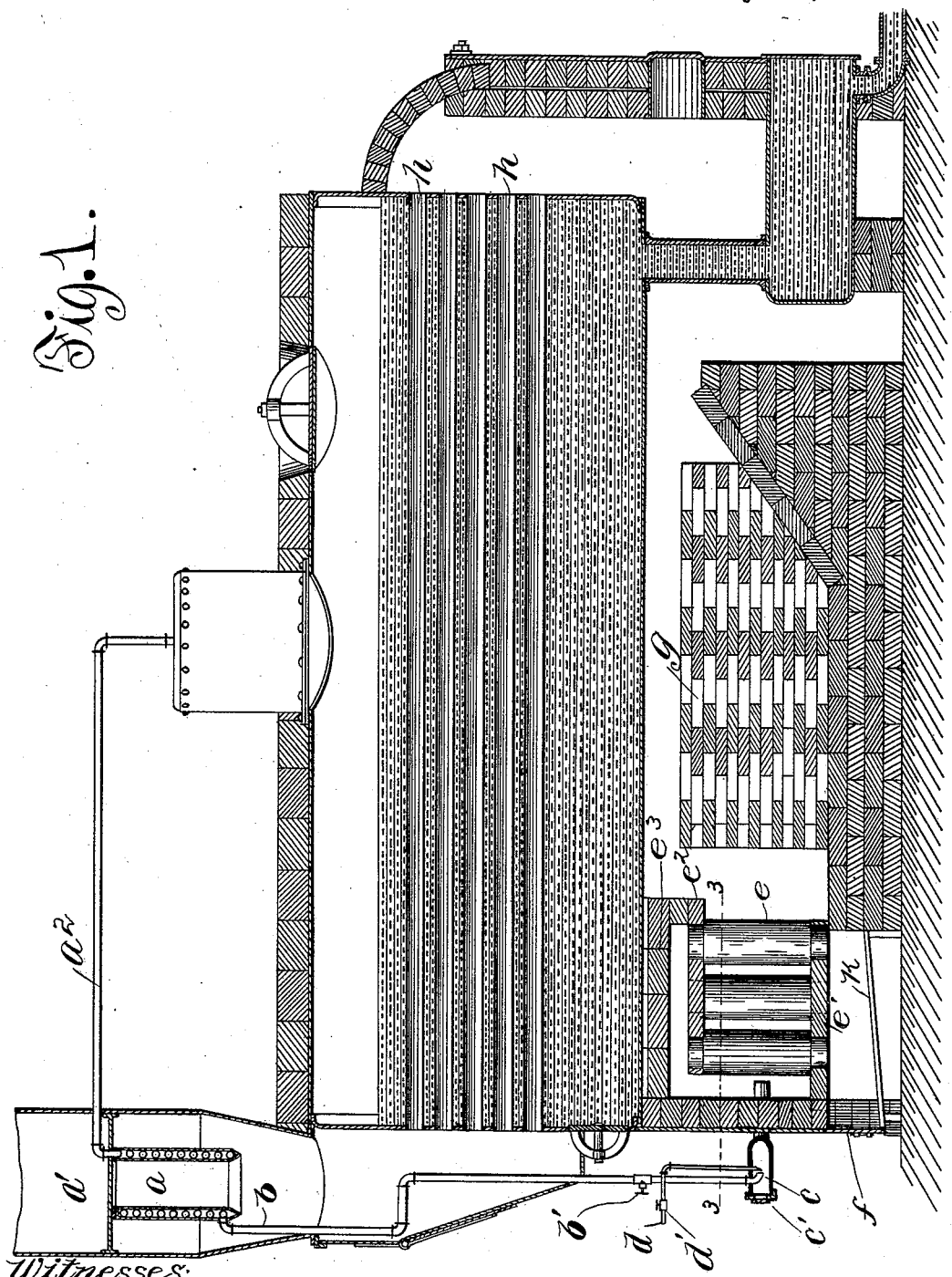

(No Model.) 2 Sheets—Sheet 1.

S. M. TRAPP.
FURNACE.

No. 523,089. Patented July 17, 1894.

Witnesses:
George L. Cragg.
W. Clyde Jones.

Inventor:
Samuel M. Trapp.
By Barton & Brown
Attorneys.

(No Model.) 2 Sheets—Sheet 2.
S. M. TRAPP.
FURNACE.
No. 523,089. Patented July 17, 1894.
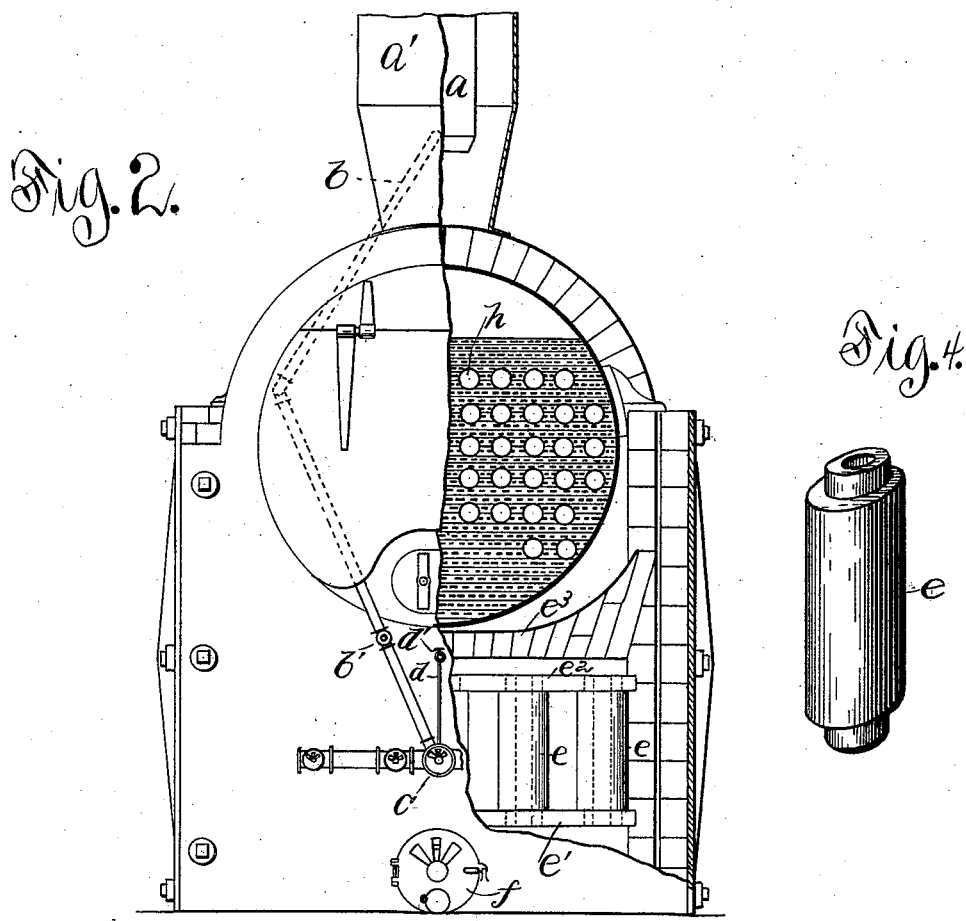
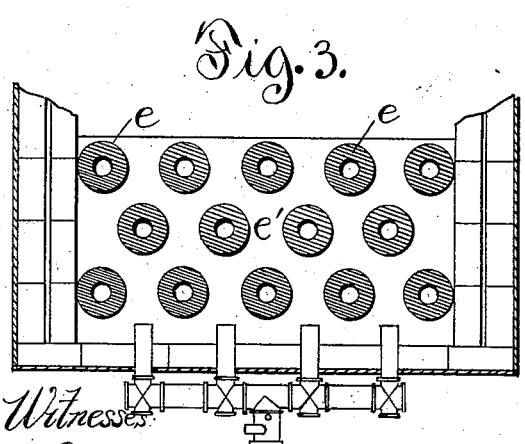
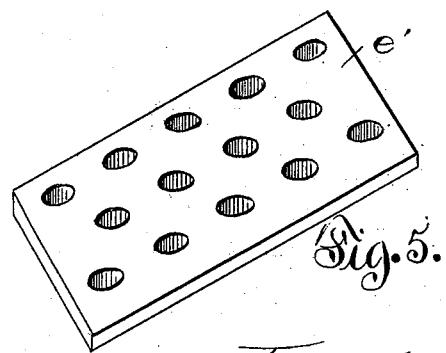
Witnesses
George L. Cragg
W. Clyde Jones
Inventor
Samuel M. Trapp
By Barton & Brown
Attorneys

UNITED STATES PATENT OFFICE.

SAMUEL M. TRAPP, OF CHICAGO, ILLINOIS, ASSIGNOR, BY DIRECT AND MESNE ASSIGNMENTS, TO THE DONAU-TRAPP CLIMAX GAS PRODUCER COMPANY, OF SAME PLACE.

FURNACE.

SPECIFICATION forming part of Letters Patent No. 523,089, dated July 17, 1894.

Application filed March 13, 1894. Serial No. 503,467. (No model.)

*To all whom it may concern:*

Be it known that I, SAMUEL M. TRAPP, a citizen of the United States, residing at Chicago, in the county of Cook and State of Illinois, have invented a certain new and useful Improvement in Furnaces, (Case No. 2,) of which the following is a full, clear, concise, and exact description, reference being had to the accompanying drawings, forming a part of this specification.

My invention relates to oil burning furnaces, and its object is to provide means for efficiently utilizing the heat obtained by the combustion of oil.

My invention, in its preferred form, comprises means for passing intermingled steam and oil in contact with highly heated refractory material to decompose the same and cause the elements to unite combustively, the air supplied for the purpose of effecting complete combustion being first brought into contact with the highly heated refractory material whereby the temperature of the same is raised before coming in contact with the steam and oil, condensation of the latter being thereby prevented. The refractory material is provided with channels or passages through which the air, admitted to the furnace, must pass before coming in contact with the oil and steam, the air thus receiving the necessary heat from the refractory material to properly raise its temperature, and, in addition, serving to continually withdraw heat from the refractory material thereby preventing the burning out of the same. The heat of combustion thus produced is then conducted to the place of application, the products of combustion being conveyed into a stack where they come in contact with and serve to super-heat steam traversing a tortuous passage, the steam thus superheated being conveyed to the mixing chamber where it is mingled with the oil, a considerable portion of the heat of the otherwise waste products of combustion being in this manner utilized in the production of heat in the furnace.

I will describe my invention more in detail in connection with the accompanying drawings, in which—

Figure 1 is a sectional view of a steam boiler embodying my invention. Fig. 2 is a front view of Fig. 1. Fig. 3 is a sectional view on line 3—3, Fig. 1. Fig. 4 is a detail view of one of the hollow tiles of refractory material. Fig. 5 is a detail view of one of the plates between which the hollow tiles are disposed.

Like letters refer to like parts in the several figures.

The superheater $a$ is located in the smoke stack $a'$ through which the products of combustion find exit, and is connected by a steam pipe $a^2$ with the steam dome of the boiler. The superheater comprises a tortuous steam passage of considerable length so that the steam in passing therethrough may absorb considerable heat from the gases of combustion. As shown in Fig. 1 the superheater comprises a coiled pipe covered with metal, or other conducting material, to form smooth interior and exterior surfaces that prevent the lodgment thereon of soot which would tend to prevent the ready access of heat to the steam. The superheater is connected by a pipe $b$ with the mixing chamber $c$, the pipe extending into the chamber from the top, its end being bent at right angles so that the steam may issue therefrom along the axis of the mixing chamber. Near the end of the steam pipe $b$ is located the end of the oil duct $d$ which is connected with an oil reservoir. Valves $b'$ and $d'$ are located in the steam and oil pipes, respectively, for controlling the admission of steam and oil.

The rear of the mixing chamber may be provided with a door $c'$ for the admission of air or for permitting access to the mixing chamber. In this instance the mixing chamber is provided with four exit nozzles, but this is purely a matter of convenience and a mixing chamber with one or more exit nozzles, or one or more mixing chambers may be provided as may be found desirable or necessary. Opposite the exit nozzles are provided a number of vertical hollow tiles $e$ of refractory material, the tiles being set in a lower plate $e'$ of refractory material and covered above by a plate $e^2$ of similar material, the intermingled oil and steam issuing from the exit nozzles striking against the tiles $e$ and passing between the plates $e'$ and $e^2$. Beneath the plate $e'$ is provided an air damper or door $f$ through which the desired quantity of air may be admitted, the same passing upward through the hollow tiles striking against the plate or wall $e^3$ of refractory material located above the plate $e^2$, and then passing to the front, where it comes in contact with the intermingled oil and steam and passes between the plates $e'$ and $e^2$. To the rear of the hollow tiles $e$ is provided a checkerwork $g$ of refractory material through which the products of combustion pass, and which absorbs the heat and permits it to pass upward into the boiler. The products of combustion after passing through the checkerwork pass through the flues $h$, imparting more heat to the water, and, finally, in passing out the smoke stack, the products of combustion come in contact with the walls of the superheater $a$ and impart heat thereto.

When it is desired to put the furnace into operation, oil from the oil duct $d$ may be admitted and ignited, the combustion of the oil serving to heat the refractory material and the checkerwork and generate a small quantity of steam which may now be admitted into the mixing chamber to intermingle with the oil and produce a more intense heat until finally steam of the desired pressure has been raised. Or the furnace may be put in operation by the provision of a grate $k$ beneath the tiles $e$ upon which a fire may be started for the purpose of generating a small quantity of steam, the products of combustion passing upward through the tiles and serving to heat the same so that when steam has been raised in sufficient quantity the oil and steam from pipes $b$ and $d$ may be admitted and the furnace rapidly brought to its normal condition of operation. The door $f$ may be provided with an opening below the level of the grate $k$, for the purpose of admitting air beneath the grate when a fire is started on the grate. During the normal operation of the furnace the door $f$ may be opened for the admission of the required quantity of air. Where a battery of boilers is to be started, steam may be raised in one of the boilers by means of the fire on the grate, and the steam generated in this boiler supplied to the furnaces of the other boilers for the purpose of starting the same.

The tiles $e$ during the burning of the furnace remain at a high heat and thus serve to decompose the oil and steam and cause the same to unite combustively with the air which passing through the hollow tiles is highly heated before coming in contact with the steam and oil. The air after passing through the hollow tiles is deflected forward by the plate or wall $e^3$ which is likewise highly heated, the plate serving to prevent the air from coming in contact with the cold boiler. The passage of the air through the hollow tiles, further serves, as before mentioned, to carry off the excess of heat from the tiles which would otherwise become so intensely heated as to burn out. By this construction, complete combustion takes place while the products are passing through the refractory material, so that the gases of combustion on issuing from the refractory material impart heat to the relatively cold checkerwork and boiler without impairment of the efficiency of combustion. Heretofore, it has been customary to effect the combustion while the products are in contact with the relatively cold objects that are to be heated, the result being that the heat absorbed by such objects greatly hinders the efficient combustion by causing a condensation of the oil and steam vapors and a cooling of the air. By the construction of my invention, complete combustion is effected while the products are passing through the highly heated refractory material, the gases of combustion coming in contact with the relatively cold objects to be heated after the completion of the combustion.

The application of my invention to water tube boilers, or to any form of furnace will be apparent, and I do not, therefore, desire to limit myself to particulars, but Having described my invention, what I claim as new, and desire to secure by Letters Patent, is—

1. The combination with the hollow tiles $e$ disposed between the plates $e'$ $e^2$ of refractory material, of the oil and steam nozzles disposed opposite said tiles, air inlets beneath said tiles, and the wall $e^3$ of refractory material above said tiles, substantially as described.

2. The combination with upper and lower walls, of hollow tiles of refractory material disposed between the same, oil and steam nozzles disposed opposite said tiles, air inlets beneath said tiles, and a passageway leading from the upper ends of said tiles to the mingled jet of steam and oil issuing from said nozzles; whereby the air is passed through the tiles before coming in contact with the oil and steam, substantially as described.

3. The combination with refractory material, of oil and steam nozzles disposed opposite the same, interior channels provided in said refractory material inaccessible to the oil and steam issuing from said nozzles, air inlets in communication with said interior channels, and a passageway leading from said channels to the mingled jet of steam and oil issuing from said nozzles; whereby the air is passed through the interior channels before coming in contact with the oil and steam, substantially as described.

In witness whereof I hereunto subscribe my name this 10th day of March, A. D. 1894.

SAMUEL M. TRAPP.

Witnesses:
GEORGE L. CRAGG,
ROBERT BARLOW.